United States Patent [19]

Jean et al.

[11] Patent Number: 5,098,067
[45] Date of Patent: Mar. 24, 1992

[54] APPARATUS FOR LIFTING LOADS ON SMOOTH CABLES

[76] Inventors: Bras Jean, 9 bis, chemin des Bourdettes, 31400 Toulouse; Gattoni Laurent, Chemin de Gastefer, 31700 Cornebarieu, both of France

[21] Appl. No.: 420,095

[22] Filed: Oct. 11, 1989

[30] Foreign Application Priority Data

Oct. 11, 1988 [FR] France ............................. 88 13715

[51] Int. Cl.⁵ ............................................. B66D 1/26
[52] U.S. Cl. .................................................. 254/320
[58] Field of Search ................ 254/320, 321, 369, 352

[56] References Cited

U.S. PATENT DOCUMENTS

| | | |
|---|---|---|
| 1,685,015 | 9/1928 | Aycock . |
| 1,887,487 | 11/1932 | Geer .................... 254/320 |
| 2,628,813 | 2/1953 | Arnold ............... 254/369 X |
| 3,116,049 | 12/1963 | Stranahan . |
| 4,139,178 | 2/1979 | Hippach . |

FOREIGN PATENT DOCUMENTS

| | | |
|---|---|---|
| 1391757 | 2/1965 | France . |
| 1411691 | 4/1965 | France . |
| 2217259 | 9/1974 | France . |
| 2221980 | 10/1974 | France . |
| 2539730 | 7/1984 | France . |
| 484178 | 1/1976 | U.S.S.R. ............................ 254/369 |
| 2055735 | 3/1981 | United Kingdom ............... 254/369 |

*Primary Examiner*—Katherine Matecki
*Attorney, Agent, or Firm*—Spensley Horn Jubas & Lubitz

[57] ABSTRACT

Apparatus for pulling loads along as vertical cable, which apparatus includes: two plates constituting a support member; two shafts mounted for free rotation relative to the support member; two pulleys each mounted for rotation on a respective shaft and each having a groove for receiving the cable, the pulleys being positioned so that the grooves lie in a common plane and the cable can be wrapped in an S-shaped configuration around the pulleys; two toothed wheels each fixed to a respective shaft and in toothed engagement with one another so as to rotate in mutually opposite directions, the toothed wheels being disposed within the support member and the pulleys being located outside of the support member and being supported by the shafts in a cantilever manner; and two detent members mounted to each act on a respective toothed wheel in a manner such that as one detent member acts to rotate its respective toothed wheel the other detent member acts to prevent reverse movement of its respective toothed wheel. Two levers are each mounted for pivotal movement about a respective one of the shafts and a crank for coordinating the movements of the first and second levers has two opposed ends each pivotally connected to a respective lever. Each detent member is coupled to a respective lever and cooperates with a respective toothed wheel to rotate the respective toothed wheel in response to pivotal movement of a respective lever in a given direction.

9 Claims, 4 Drawing Sheets

APPARATUS FOR LIFTING LOADS ON SMOOTH CABLES

BACKGROUND OF THE INVENTION

The present invention relates to a lifting apparatus which, by frictional engagement with a vertically extending cable of metal or of fiber (rope) is able to, preferably, raise or lower loads along the cable.

The invention relates more particularly to apparatus which does not include a driving drum. It is applied, more specifically, to apparatus of the type including at least two fixed upper and lower pulleys disposed in a coplanar arrangement to cause the cable to follow an S-shaped path around grooves in the pulleys. The driving force produced by a motor mechanism arranged to control rotation of the pulleys is thus linked exponentially to the total angular extent over which the cable engages the pulleys and to the extent of penetration, or wedging, of the cable into the pulley grooves.

At present, a number of types of apparatus known as winches or hoists and not including an entrainment drum have already been proposed.

One apparatus called a "cable pull", is arranged in a manner such that the cable is driven in both directions by two self-clamping jaw blocks. Movement is communicated by a lever and a system of connecting rods with force multiplication in a manner such that the cable passes through the apparatus without being stored therein but must be introduced via one of its ends.

Another apparatus called a "rope hoist" includes a single pulley with a groove arranged with two pawls, one for driving and one for holding stationary. The pulley is disposed between two beams of a support, or frame, and the rope must be introduced into the apparatus via one of its ends.

Another type of apparatus is composed of three driving pulleys keyed to the same shaft and driven by two cranks acting on a pinion and on a toothed wheel. In addition to the need to introduce the cable via one of its extremities, it is necessary to form a loop around each pulley and to slide the cable over a relatively substantial length while turning the cranks to obtain a minimum tension.

SUMMARY OF THE INVENTION

Taking into consideration the state of the art, applicant has devised a novel apparatus of the type comprising at least two fixed upper and lower pulleys which are coplanar to one another and around which a cable is wrapped, in an S-shaped configuration, within the pulley grooves. According to the invention, this apparatus offers the advantage that the two pulleys are each coupled coaxially to a respective toothed wheel, the two toothed wheels being driven in respectively opposite directions and being coplanar with one another and arranged so that the teeth on one wheel engage those on the other wheel. The two drive shafts on which the pulleys are keyed and the toothed wheels are mounted to rotate freely in a space between two parallel plates which, forming a support, provide the entire support for the two toothed wheels and, outside of the space enclosed by the two plates, support the pulleys in a cantilever or overhanging fashion.

This arrangement offers a great advantage by permitting all of the drive mechanism to be enclosed within the support structure while allowing access to the two pulleys. It should be evident that this enables the apparatus to be brought into engagement with the cable at any point along the length of the cable, so that the drawbacks associated with systems in which the cable must be introduced via one of its ends are eliminated.

According to a first embodiment of the invention intended to assure manual operation of the apparatus, the mutually opposite rotational movements of the two toothed wheels which engage one another are controlled by two pawls which, disposed at opposite extremities of a linkage, are disposed in a manner such that when one of them engages a toothed wheel and acts to produce a rotational movement, the other pawl, engaging the other wheel, serves as a retainer to prevent rotation in the opposite direction. These two pawls are also articulated to two levers each of which is mounted to pivot about a respective one of the two shafts, which thus serve as pivotal supports. At least one of these levers is provided with an extension forming a lever arm to which a manual force can be applied.

The predisposition and reversibility of the roles of the two pawls are particularly advantageous because, while assuming that the two toothed wheels are maintained in engagement for mutual rotation, the pawls also assure the rotational driving of the toothed wheels regardless of whether the lever arm is moving upwardly or downwardly.

According to a preferred embodiment of the invention, the two levers are each provided with an extension forming an arm, with one of the arms disposed so that the associated pawl is positioned between the arm and the associated supporting shaft and the other arm being disposed so that the supporting shaft is between the associated pawl and the other arm. Thus, the efficiency with which manual force is utilized is considerably improved due to the torque produced, which can be achieved either with two hands, or with two feet with the aid of stirrups, or a combination of the two.

According to a second embodiment of the invention permitting motorized operation of the apparatus, at least one of the toothed wheels engages a pinion coupled to a motor output shaft via a reduction gear.

While the principle novel aspects of the present invention have been described briefly above, other characteristics and advantages will appear more clearly from a reading of the following description, given by way of nonlimiting example and with reference to the attached drawings, the concepts of the invention being applicable to various embodiments of an apparatus for lifting or lowering a load.

DESCRIPTION OF THE PREFERRED EMBODIMENTS

Figure 1:
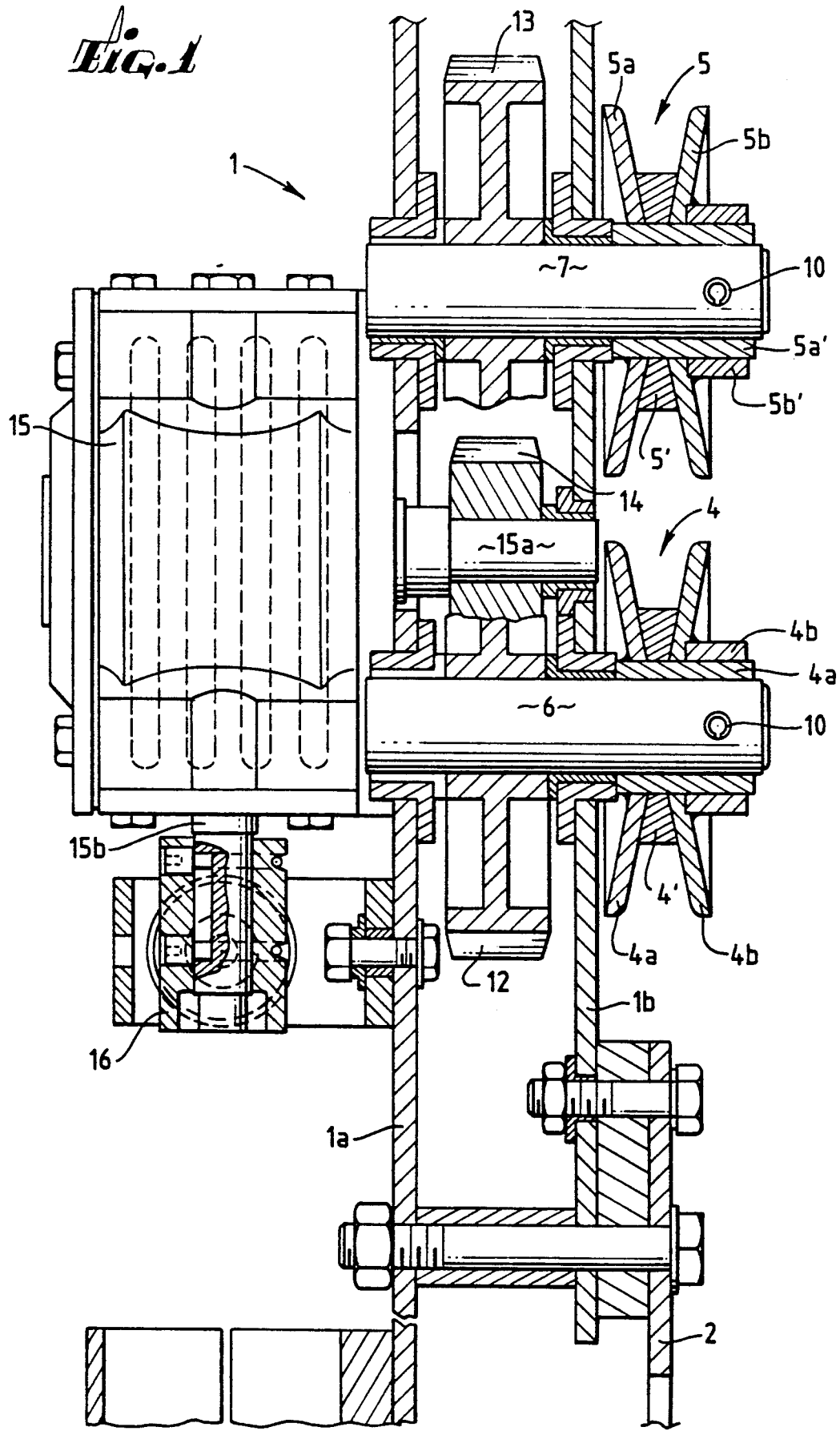
FIG. 1 is an elevational view, partly in cross section, of a preferred embodiment of an apparatus according to the invention which is to be driven by a motor.
Figure 2:
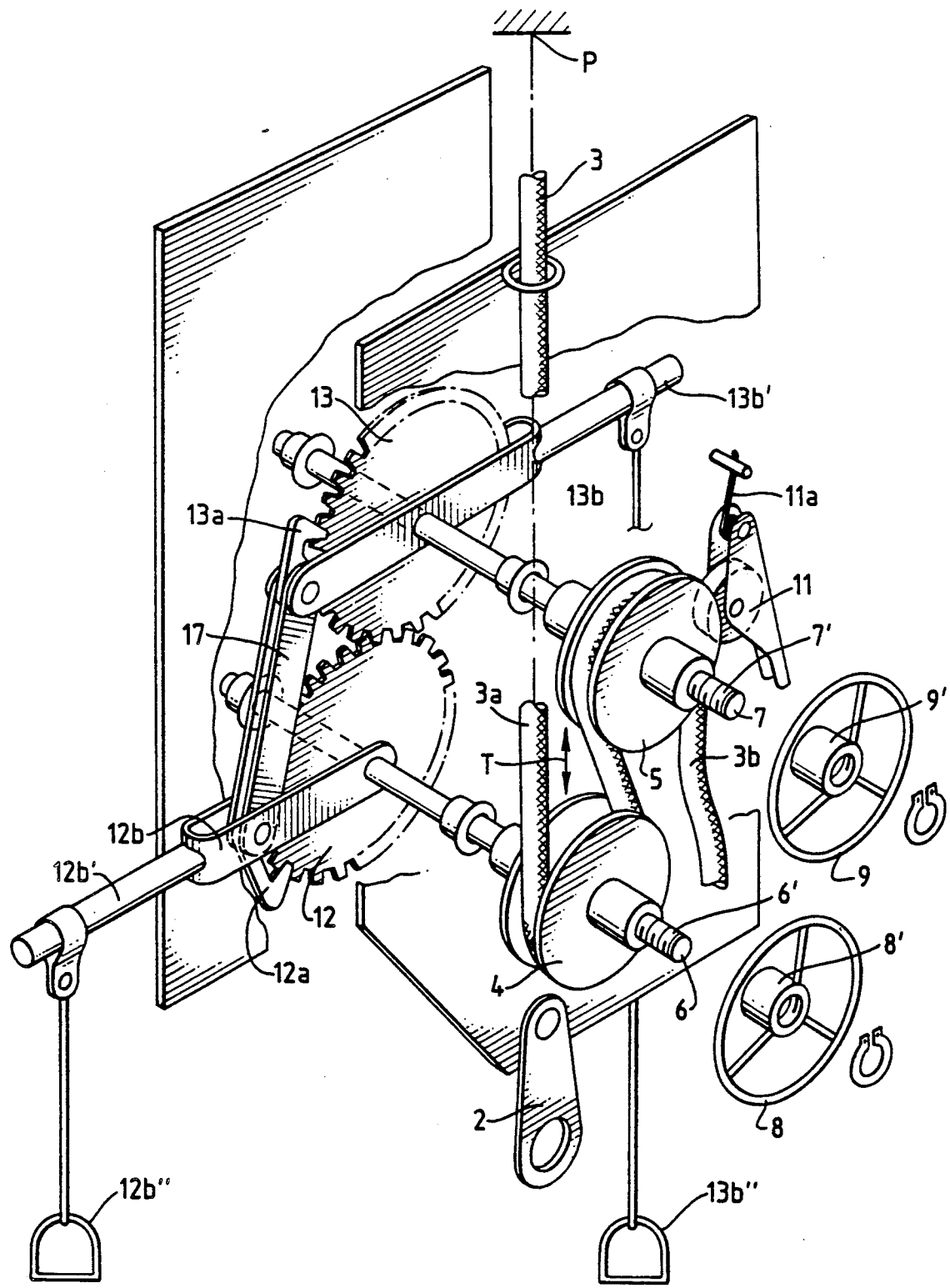
FIG. 2 is a simplified front perspective view of a second preferred embodiment of the invention constructed to be driven manually.
Figure 3:
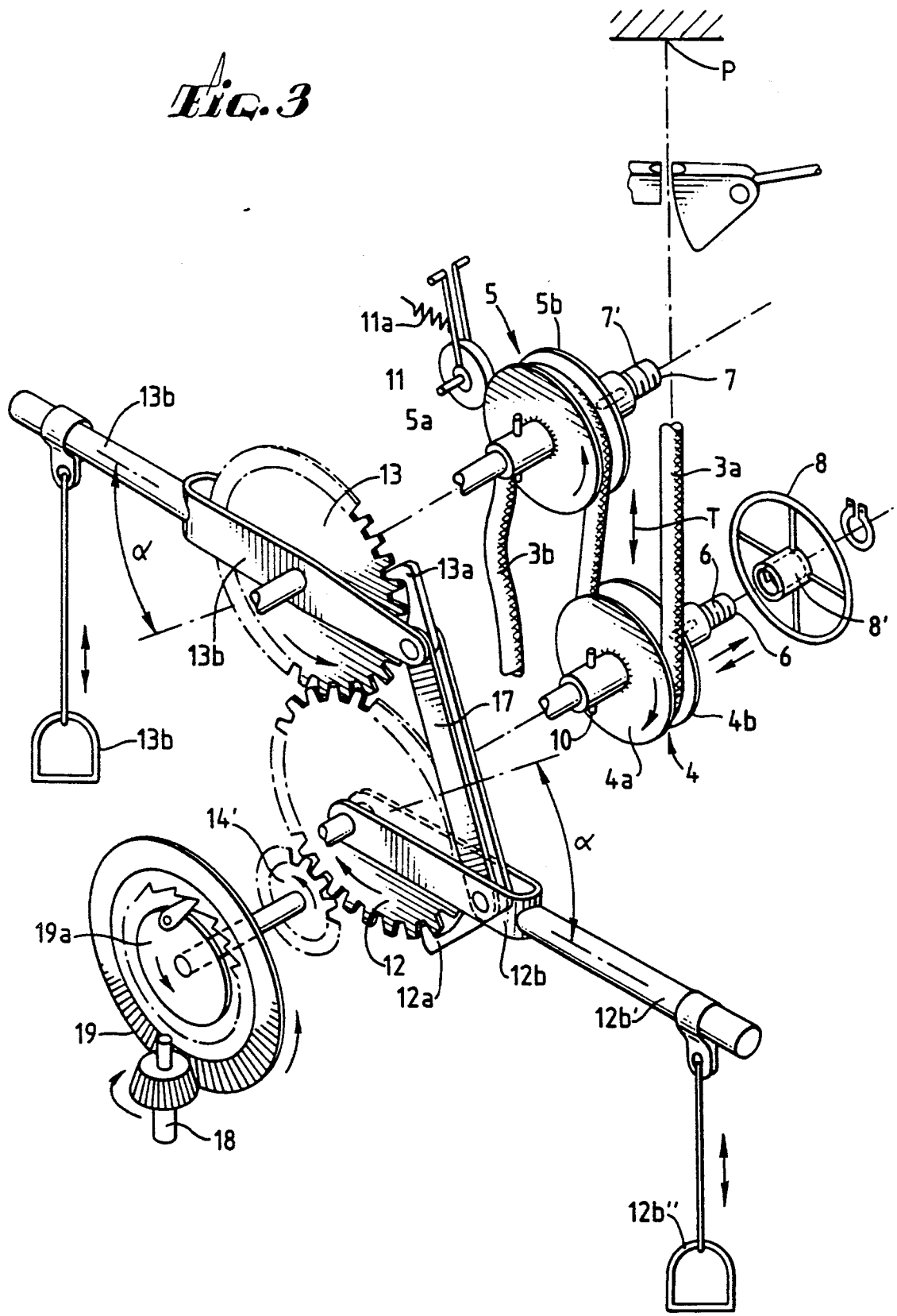
FIG. 3 is a rear perspective view of a further embodiment of the invention containing the mechanism of the embodiment of FIG. 2, but further equipped for motorized operation.

The embodiments shown in FIGS. 1, 2 and 3 are identified as embodiments I, II and III, respectively. Each of these apparatus embodiments is constituted by a support, or housing, 1 constituted by two parallel plates 1a and 1b. Plate 1b is provided with a hook or an eye 2 for supporting a load with the aid of a device adapted to the use which will be made of the apparatus (winch, hoist, etc.). Each embodiment is intended to effect lifting or lowering of the load, as indicated by arrow T, on a smooth vertical cord or cable 3 composed of an upper reach 3a extending between the apparatus and a fixed point P, and an unrestrained lower reach 3b.

Vertical translational movement of the apparatus on cable 3 is produced by means of a lower pulley 4 and an upper pulley 5 disposed in a common plane so that cable 3 can be wrapped therearound in the form of an S and can engage in the grooves formed in the pulleys. The driving force between the cable and the apparatus is an exponential function of the total angle over which cable 3 is wrapped around the two pulleys and the extent to which cable 3 is wedged in the pulley grooves.

As is apparent from the FIG. 1, each of pulleys 4 and 5 is constituted by two disassemblable discs 4a, 4b and 5a, 5b each fixed on a respective hub 4a', 4b' and 5a', 5b'. These hubs are provided with bores dimensioned so that hubs 4a' and 5a' to the side of plate 1b, on the one hand, adjust themselves on two drive shafts 6 and 7 mounted to be freely rotatable in bearings supported between parallel plates 1a and 1b, and hubs 4b' and 5b', on the other hand, adjust themselves on hubs 4a' and 5a'. The disassemblable nature of the discs of the two pulleys 4 and 5 has for its object to permit, with the aid of an appropriate blocking device, an adjustment of the separation distance between the two discs of each pulley. This adjustment can be selected on the basis of the diameter of cable 3 in order to effect the desired degree of clamping of the cable between each pair of pulley discs.

Adjustment of the clamping of cable 3 within the grooves in pulleys 4 and 5 can be varied during use of the apparatus in order to provide more or less sliding of the cable wrapped around the pulleys in a manner to create a brake which adjusts the speed of descent of the apparatus when it is used as a lowering device in caving or mountain climbing. This adjustment of the separation between the discs is useful for embodiments II and III when operated manually. For this purpose, the free ends of shafts 6 and 7 carrying pulleys 4 and 5 are provided with threaded shanks 6' and 7' onto which can be screwed clamping nuts 8' and 9' forming the hubs of control wheels 8 and 9.

The diameter at which cable 3 is wrapped can be preset by arranging a ring 4' or 5' between the discs of each pulley to provide the base of each pulley groove.

For motorized driving such as achieved in embodiment I, translational and rotational movement of the hubs 4a', 4b' and 5a', 5b' with respect to their shaft 6 or 7 for each of the two pulleys are blocked by fixing the hubs to the respective shaft, for example by keys, cotter pins or cylindrical retaining pins 10. This system is preferred when the pulleys are disposed at the end of the respective shafts and are driven by a motor, descent of the apparatus of embodiment I along cable 3 thus being assured by reversal of the rotational movements of pulleys 4 and 5 and controlled in speed by the speed of rotation of the motor output shaft.

In order to maintain cable 3 in place within the pulley grooves, a pressing roller 11 is maintained against cable 3 by a suitable torsion spring 11a at the location of the upper end of the unrestrained reach 3b.

According to a principal feature of the present invention, the two pulleys 4 and 5 are coupled coaxially, on shafts 6 and 7, respectively, to two toothed driving wheels 12 and 13, respectively. Wheels 12 and 13 each keyed to a respective shaft 6, 7 and are mounted in a coplanar manner relative to one another to be rotated in respectively opposite directions and are disposed between the two plates 1a and 1b of support 1 in a such a manner that pulleys 4 and 5 are mounted in a cantilever manner outside of support 1. This disposition of pulleys 4 and 5 facilitates the installation of cable 3 around pulleys 4 and 5 at any point along the length of the cable.

Driving of toothed wheels 12 and 13 can be achieved either manually, or via a motor. Alternatively, embodiments of the invention can be constructed to be driven in either manner.

The embodiment shown in FIG. 1 is constructed solely for motorized operation. For this purpose, toothed wheel 12, for example, meshes with a pinion 14 mounted on a shaft 15a to be coplanar with wheels 12 and 13, pinion 14 also being located between plates 1a and 1b. Pinion 14 is keyed to shaft 15a which is the output shaft of a speed reducer 15 which has a reduction ratio corresponding to the velocity of travel of cable 3 relative to the apparatus as a function of the tension on cable 3, which is proportional to the weight of the load being raised or lowered. Speed reducer 15 has an input shaft 15b provided with a sleeve 16 which couples shaft 15b to a screw-type motor (not shown). Within sleeve 16 there is provided a brake equipped with shoes that can be moved away from one another and that carry replaceable linings. These shoes are mounted to be pivotable about an axis perpendicular to the axis of speed reducer inlet shaft 15b in a manner to produce a gripping torque which is proportional to the load exerted on reducer inlet shaft 15b. In addition, this brake functions in a double manner which is of great value if the user should panic and operate this brake purely by instinct.

In embodiment II illustrated in FIG. 2, opposite rotational movements of the two toothed wheels 12 and 13 are effected manually. For this purpose, rotation of these two toothed wheels 12 and 13 is effected by two pawls 12a and 13a which are articulated at the two ends of crank 17 so that as one of the pawls is acting to drive its respective toothed wheel, the other pawl is displaced from one tooth to the other of its associated wheel and acts as a detent to prevent its associated wheel from rotating in the direction opposite to that desired. These two pawls 12a and 13a are each also pivotally mounted on a respective lever 12b and 13b, each lever being mounted to pivot about a respective one of shafts 6 and 7 which thus serve as pivot supports. The two levers 12b and 13b are each provided with a projecting member 12b' and 13b', respectively, each forming a lever arm. Projecting member 12b' is located so that pawl 12a is disposed between projecting member 12b' and shaft 6, while projecting member 13b' is located so that shaft 7 is positioned between pawl 13a and projecting member 13b'. A lever force, or torque, can be applied to arms 12b' and 13b' by muscular force exerted with the hands or with the feet, with the aid of stirrups 12b" and 13b", with the result that pawls 12a and 13a act in alternation to rotate their respective toothed wheels 12, 13, while the pawl which is not performing a driving function acts to prevent reverse movement of its associated toothed wheel.

In embodiment III shown in FIG. 3, the mutually opposite rotational movements of toothed wheels 12 and 13 can be effected either manually or via a motor. In order to assure that manual movement of lever arms 12b' and 13b' does not result in a rotational movement of the outlet shaft 18 of the motor, shaft 18 is coupled to pinion 14 via a reducer 19 having a small wheel 19a located within a larger wheel and coupled thereto via a free wheeling clutch arrangement.

Figure 4:
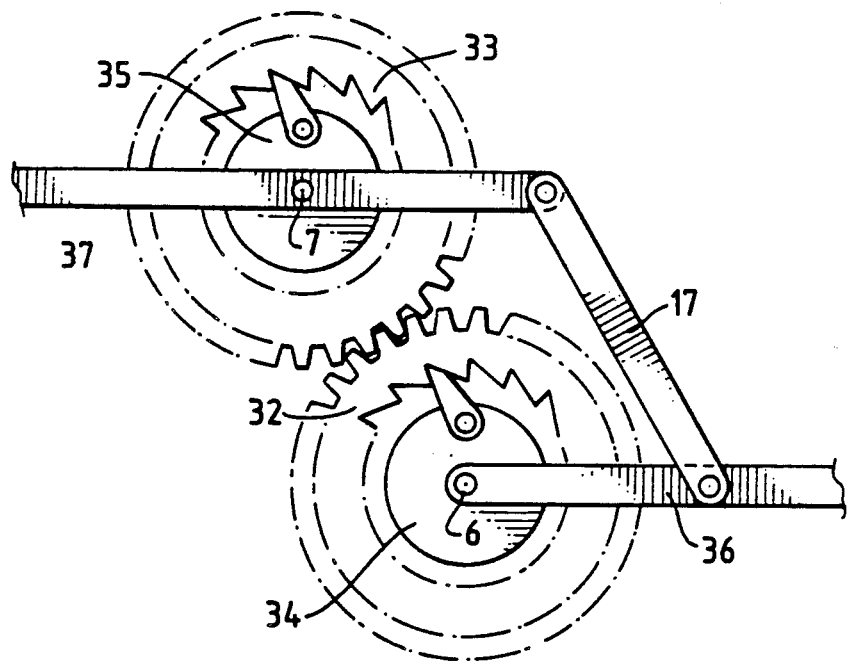
FIG. 4 is a rear elevational detail view of a further embodiment of a driving mechanism used in apparatus according to the present invention.

FIG. 4 shows a further embodiment of the invention in which the pawls shown in FIGS. 1-3 are replaced by free wheeling clutch arrangements. Specifically, each of toothed wheels 32 and 33 has an annular form and surrounds a respective small wheel 34, 35. In addition, each small wheel 34, 35 carries a detent member and the inner periphery of each toothed wheel 32, 33 has a sawtooth structure to form a free wheeling clutch mechanism. Each small wheel 34, 35 is mounted for free rotation relative to a respective shaft 6, 7. Each toothed wheel 32, 33 is fixed, as by a keyed hub (not shown) to rotate with a respective shaft 6, 7.

A first lever 36 is fixed to wheel 34 to pivot therewith about the axis of shaft 6 and a second lever is fixed to wheel 35 to pivot therewith about the axis of shaft 7. Levers 36 and 37 are coupled together by crank 17 in the same manner as the levers of FIGS. 2 and 3.

If lever 36 is pivoted clockwise by a manual force, the clutch mechanism associated with small wheel 34 causes toothed wheel 32 and shaft 6 to rotate clockwise. As a result of the engagement between toothed wheels 32 and 33, toothed wheel 33 and shaft 7 are caused to rotate counterclockwise while lever 37 and small wheel 35 are pivoted clockwise by the action of crank 17, small wheel 35 being permitted to rotate relative to toothed wheel 33 by the free wheeling action of the associated clutch mechanism.

The reverse sequence occurs when lever 37 is pivoted counterclockwise.

This application relates to subject matter disclosed in French Patent Application No. 88.13715, filed on Oct. 11, 1988, the disclosure of which is incorporated herein by reference.

It will be appreciated that the illustrated embodiments are described herein only by way of example and not for purposes of limitation of the scope of the invention. Of course, various rearrangements, modifications and improvements could be made to the illustrated embodiments without departing from the spirit of the invention. Thus, for example, pawls 12a and 13a could be replaced by free-wheeling clutch arrangements similar to the arrangement of reducer 19, 19a shown in FIG. 3. In this case, each lever would be fixed to the small wheel of a respective clutch arrangement. It will be understood that each such clutch arrangement would include an outer wheel having peripheral teeth engaging the outer wheel of the other clutch arrangement.

What is claimed is:

1. In apparatus for pulling loads along a vertical cable, which apparatus includes: two plates constituting a support member; first and second shafts mounted for free rotation relative to the support member; first and second pulleys each mounted for rotation on a respective shaft and each having a groove for receiving the cable, the pulleys being positioned so that the grooves lie in a common plane and the cable can be wrapped in an S-shaped configuration around the pulleys; first and second toothed wheels fixed, respectively, to the first and second shafts and in toothed engagement with one another so as to rotate in mutually opposite directions, the toothed wheels being disposed within the support member and the pulleys being located outside of the support member and being supported by the shafts in a cantilever manner; first and second pawls; and means mounting the pawls such that the first and second pawls act respectively on the first and second toothed wheels in a manner such that as one pawl acts to rotate its respective toothed wheel the other pawl acts to prevent reverse movement of its respective toothed wheel, the improvement wherein:

said means mounting said pawls comprise: first and second levers each mounted for pivotal movement about a respective one of said shafts; and a crank having two opposed ends, each end of said crank being pivotally connected to a respective lever at a location spaced from the respective one of said shafts for causing said levers to undergo pivotal movement in unison with one another, and each said pawl being articulated to a respective lever and to a respective end of said crank;

and said apparatus further comprises at least one elongated member secured to one of said levers and forming a lever arm to which a manual force can be supplied.

2. Apparatus as defined in claim 1 wherein: said at least one elongated member includes a first elongated member secured to said first lever and a second elongated member secured to said second lever; said first elongated member is disposed such that said first pawl is positioned between said first elongated member and said first shaft; and said second elongated member is disposed such that said second shaft is positioned between said second pawl and said second elongated member.

3. Apparatus as defined in claim 1 wherein each said pulley is composed of two disassemblable discs and connecting means permitting the spacing between said discs to be varied in dependence on the thickness of the cable in order to grip the cable in a controlled manner.

4. Apparatus as defined in claim 3 wherein each said shaft has a free end at which its respective pulley is mounted; said free end of each said shaft is threaded; and said connecting means comprise a threaded member engageable with said threaded end of the respective pulley and an operating wheel connected to said threaded member for rotating said threaded member on said threaded shaft of the respective pulley in order to adjust the spacing between said discs.

5. Apparatus as defined in claim 3 wherein: one disc of each said pulley is directed toward said support member; and each said pulley further comprises a first sleeve mounted on a respective one of said shafts, carrying said one disc of said pulley associated with said respective shaft, and movable relative to said shaft in the axial direction of said shaft, a second sleeve mounted on said first sleeve, carrying the other disc of said pulley, and movable relative to said first sleeve in the axial direction of said shaft, and fastening means fastening said sleeves to said shaft.

6. Apparatus as defined in claim 5 further comprising a pinion gear in toothed engagement with one of said toothed wheels, a drive motor having a motor shaft; and means coupling said pinion to said motor shaft; wherein said means coupling said pinion to said motor shaft comprise: a speed reducer having an output shaft carrying said pinion and an input shaft; and a coupling sleeve coupling said input shaft to said motor, said sleeve being provided with a brake having jaws movable in two directions and provided with replaceable linings mounted to pivot around an axis perpendicular to the axis of said input shaft.

7. Apparatus as defined in claim 6 wherein said speed reducer further comprises a wheel carrying said output shaft and freely rotatably in one direction.

8. Apparatus as defined in claim 6 wherein said motor is of the screw type.

9. In an apparatus for pulling loads along a vertical cable, which apparatus includes: two plates constituting a support member; first and second shafts mounted for free rotation relative to the support member; first and second pulleys each mounted for rotation on a respective shaft and each having a groove for receiving the cable, the pulleys being positioned so that the grooves lie in a common plane and the cable can be wrapped in an S-shaped configuration around the pulleys; first and second toothed wheels fixed respectively, to said first and second shafts and in toothed engagement with one another so as to rotate in mutually opposite directions, the toothed wheels being disposed within the support member and the pulleys being located outside of the support member and being supported by the shafts in a cantilever manner; first and second detent members and means mounting the detent members such that said first and second detent members act respectively on said first and second toothed wheels in a manner such as one detent member acts to rotate its respective toothed wheel the other detent member acts to prevent reverse movement of its respective toothed wheel, the improvement wherein:

each said toothed wheel has an annular form; and
said means mounting said detent members comprise: first and second levers each mounted for pivotal movement about a respective one of said shafts; a crank having two opposed ends, each end of said crank being pivotally connected to a respective lever at a location spaced from the respective one of said shafts for causing said levers to undergo pivotal movement in unison with one another; first and second interior wheels each disposed within a respective one of said toothed wheels, each supported for free rotation about the axis of a respective one of said shafts, each fixed to a respective one of said levers, and each carrying a respective one of said detent members; and at least one elongated member secured to one of said levers and forming a lever arm to which a manual force can be applied, and wherein each said toothed wheel has an interior periphery configured to cooperate with an associated detent member to form a free wheeling clutch mechanism therewith.

* * * * *